(12) United States Patent
Rockenfeller et al.

(10) Patent No.: US 11,692,779 B2
(45) Date of Patent: Jul. 4, 2023

(54) FLEXIBLE COOLING SYSTEM WITH THERMAL ENERGY STORAGE

(71) Applicant: Rocky Research, Boulder City, NV (US)

(72) Inventors: Uwe Rockenfeller, Boulder City, NV (US); Kaveh Khalili, Boulder City, NV (US)

(73) Assignee: Rocky Research, Boulder City, NV (US)

( * ) Notice: Subject to any disclaimer, the term of this patent is extended or adjusted under 35 U.S.C. 154(b) by 340 days.

(21) Appl. No.: 16/751,058

(22) Filed: Jan. 23, 2020

(65) Prior Publication Data

US 2021/0231388 A1 Jul. 29, 2021

(51) Int. Cl.
| | | |
|---|---|---|
| *F28D 20/02* | (2006.01) | |
| *F25B 1/00* | (2006.01) | |
| *F28D 20/00* | (2006.01) | |
| *F41H 13/00* | (2006.01) | |
| *F25B 41/20* | (2021.01) | |

(52) U.S. Cl.
CPC .............. *F28D 20/028* (2013.01); *F25B 1/00* (2013.01); *F28D 20/0056* (2013.01); *F41H 13/005* (2013.01); *F25B 41/20* (2021.01); *F25B 2400/053* (2013.01); *F25B 2400/24* (2013.01); *F28D 2020/0047* (2013.01); *F28D 2020/0078* (2013.01)

(58) Field of Classification Search
CPC .... F25B 1/00; F25B 1/005; F25B 1/02; F25B 1/04; F25B 1/047; F25B 1/053; F25B 1/06; F25B 1/08; F25B 1/10; F25B 25/005; F25B 25/02; F25B 15/02; F25B 17/02

See application file for complete search history.

(56) References Cited

U.S. PATENT DOCUMENTS

| | | |
|---|---|---|
| 1,916,028 A | 6/1933 | Willsie |
| 1,993,585 A | 3/1935 | Baumann et al. |
| 2,050,959 A | 8/1936 | Normelli |
| 3,421,978 A | 1/1969 | Gollion et al. |
| 3,500,636 A | 3/1970 | Craig |
| 4,231,849 A | 11/1980 | Hutchinson et al. |

(Continued)

FOREIGN PATENT DOCUMENTS

| | | |
|---|---|---|
| DE | 100 62 174 A1 | 6/2001 |
| DE | 10 2013 216462 A1 | 2/2014 |

(Continued)

OTHER PUBLICATIONS

Save home heat co, Understanding Heat Load and Heating Capacity, Feb. 29, 2016, https://savehomeheat.com/understanding-heat-load-and-heating-capacity/ (Year: 2016).*

(Continued)

*Primary Examiner* — Miguel A Diaz
*Assistant Examiner* — Khaled Ahmed Ali Al Samiri
(74) *Attorney, Agent, or Firm* — Shumaker & Sieffert, P.A.

(57) ABSTRACT

Disclosed are systems and methods of flexibly cooling thermal loads by providing a complex compound system for burst mode cooling, a vapor compression system for ancillary cooling, and a thermal storage system for helping efficiently maintain and cool a thermal load such as a directed energy weapon system.

22 Claims, 4 Drawing Sheets

(56) References Cited

U.S. PATENT DOCUMENTS

| | | | |
|---|---|---|---|
| 4,290,273 | A | 9/1981 | Meckler |
| 4,328,677 | A | 5/1982 | Meckler |
| 4,367,634 | A | 1/1983 | Bolton |
| 4,505,123 | A | 3/1985 | Kusakabe et al. |
| 4,519,441 | A | 5/1985 | Spevack |
| 4,848,994 | A | 7/1989 | Rockenfeller et al. |
| 4,907,405 | A | 3/1990 | Polizzotto |
| 5,161,389 | A | 11/1992 | Rockenfeller et al. |
| 5,231,849 | A | 8/1993 | Rosenblatt |
| 5,279,359 | A | 1/1994 | Erickson |
| 5,335,510 | A | 8/1994 | Rockenfeller et al. |
| 5,384,101 | A | 1/1995 | Rockenfeller |
| 5,664,427 | A | 9/1997 | Rockenfeller et al. |
| 6,006,527 | A | 12/1999 | Hansen et al. |
| 6,224,842 | B1 | 5/2001 | Rockenfeller et al. |
| 7,421,846 | B2 * | 9/2008 | Narayanamurthy .... F25D 16/00 62/333 |
| 9,211,493 | B2 | 12/2015 | Applegarth et al. |
| 10,003,053 | B2 | 6/2018 | Hartmann et al. |
| 2004/0101457 | A1 | 5/2004 | Pahlman et al. |
| 2005/0081548 | A1 | 4/2005 | Leet et al. |
| 2005/0262870 | A1 * | 12/2005 | Narayanamurthy .... F25B 40/02 62/434 |
| 2006/0247463 | A1 | 11/2006 | Rangachari et al. |
| 2010/0157525 | A1 | 6/2010 | Ullman et al. |
| 2011/0005267 | A1 | 1/2011 | Lambert et al. |
| 2011/0265506 | A1 | 11/2011 | Alston |
| 2012/0018116 | A1 | 1/2012 | Mathur et al. |
| 2012/0256045 | A1 | 10/2012 | Gagne |
| 2012/0263980 | A1 | 10/2012 | Soukhojak et al. |
| 2013/0047639 | A1 | 2/2013 | Stannard et al. |
| 2014/0102662 | A1 | 4/2014 | Grama et al. |
| 2015/0129160 | A1 | 5/2015 | Burk |
| 2015/0143806 | A1 | 5/2015 | Friesth |
| 2015/0292775 | A1 | 10/2015 | Ma et al. |
| 2016/0238286 | A1 | 8/2016 | Rockenfeller et al. |
| 2016/0334154 | A1 | 11/2016 | Srichai et al. |
| 2018/0252425 | A1 | 6/2018 | Laughman et al. |
| 2018/0252453 | A1 * | 9/2018 | Rockenfeller .......... F25B 15/06 |
| 2018/0328673 | A1 | 11/2018 | Stoia et al. |
| 2019/0017751 | A1 | 1/2019 | Singh et al. |
| 2020/0041175 | A1 | 2/2020 | Rockenfeller et al. |
| 2020/0198750 | A1 * | 6/2020 | Laird ...................... F25D 16/00 |

FOREIGN PATENT DOCUMENTS

| | | |
|---|---|---|
| EP | 0 515 923 A2 | 12/1992 |
| EP | 3208558 A1 | 8/2017 |
| JP | H04-504224 | 7/1992 |
| JP | H08014691 | 1/1996 |
| JP | H08-504929 | 5/1996 |
| JP | 2004069294 | 3/2004 |
| JP | 2012246928 | 12/2012 |
| JP | 2014-518059 | 7/2014 |
| JP | 2016-080340 | 5/2016 |
| WO | 94/11685 A1 | 5/1994 |
| WO | WO 96/39577 A1 | 12/1996 |
| WO | WO 2006/135871 A2 | 12/2006 |
| WO | 2012/148450 A1 | 11/2012 |
| WO | WO 2016/076947 A1 | 5/2016 |

OTHER PUBLICATIONS

International Search Report for International Application No. PCT/US2021/014144 dated Jun. 11, 2021.

Invitation to Pay Additional Fees for International Application No. PCT/US2021/014144 dated Apr. 21, 2021.

* cited by examiner

FLEXIBLE COOLING SYSTEM WITH THERMAL ENERGY STORAGE

BACKGROUND

Field of the Invention

This disclosure relates generally to a flexible refrigeration system that provides rapid cooling features in conjunction with a thermal energy storage system. In particular, the system may include a complex compound cooling system to cool rapid bursts of heat, a thermal energy storage system, and a conventional vapor compression system.

Description of the Related Art

Adsorption/desorption or also referred to as absorption/desorption reactions between polar gases and certain metal salts yield complex compounds which are the basis for efficient refrigeration, thermal storage, heat pump systems and power systems having high energy density. However, energy density, a measure of the quantity of polar gas adsorbed on the salt, which translates into the amount of work or energy which can be stored in a given amount of the complex compound, is only one parameter to be considered in designing commercially attractive systems. Complex compound systems have the ability to excerpt very high power densities thus being able to provide rapid or burst cooling.

Other types of systems, such as conventional vapor compression systems may be efficient at cooling environmental loads, such as rooms or systems with relatively slow gains in heat. However, these systems do not provide rapid cooling features since these systems may take up to a minute or in some cases more to reach full capacity and usually several minutes or longer to provide cooling to the target heat load. However, once these vapor compression systems are running they can be efficient in cooling a target heat load to a specific temperature.

Thermal energy storage systems have been used to level the cooling load by substituting cooling capacity and at times reduce costs in many environments. For example, a thermal energy system may include a cooling system that freezes a large tank of ice or other media such as paraffin, salt hydrate or aqueous mixtures of ethylene or propylene glycol. The cooling system freezes the mixtures within the tank during the night, when costs to run the cooling system are lower. During discharge of the thermal energy storage system, the system circulates a heat transfer fluid, e.g. refrigerant or the cold aqueous mixtures through a heat exchanger, such as, to absorb heat from the environment without the need to run the cooling system during peak energy times or to supplement insufficient capacity of the cooling system.

SUMMARY

The embodiments disclosed herein each have several aspects no single one of which is solely responsible for the disclosure's desirable attributes. Without limiting the scope of this disclosure, its more prominent features will now be briefly discussed. After considering this discussion, and particularly after reading the section entitled "Detailed Description of Certain Embodiments," one will understand how the features of the embodiments described herein provide advantages over existing systems, devices and methods.

One embodiment of the invention is a thermal management system for a high energy laser. This embodiment may include: a vapor compression system; a thermal energy storage system comprising a phase change material; and a complex compound burst cooling thermal energy storage system, wherein the thermal energy system and complex compound burst cooling system are in thermal communication with the high energy laser, and the vapor compression system is configured to cool ancillary equipment connected to the high energy laser. In one embodiment, the vapor compression system is configured to cool the thermal energy storage system. In another one embodiment the vapor compression system is also configured to supplement laser cooling during periods where the high energy laser is active.

Another embodiment is a method of cooling a high energy laser. This embodiment may include: detecting activation of the high energy laser; initiating a complex compound burst cooling system to circulate thermal heat transfer fluid to the high energy laser to absorb heat; and routing thermal heat transfer fluid from a thermal energy storage system to the high energy laser to supplement the cooling provided by the complex compound burst cooling system. In one embodiment, the method includes routing thermal heat transfer fluid from a vapor compression system to supplement laser cooling. In another embodiment, the method includes routing thermal heat transfer fluid from the vapor compression system to cool ancillary equipment connected to the high energy laser.

Still another embodiment is a thermal energy storage system. The thermal energy storage system may include a phase change material and be connected to a cooling loop comprising pumps for controlling speed or torque. In one embodiment, the pumps are run by connected motors. The thermal energy storage system may also have a thermal transfer liquid disposed within the cooling loop; and a vector control system communicating with the one or more pumps adjust compressor torque. The vector control system may be used to control a motor connected to a pump which moves the thermal transfer liquid through the cooling loop. The thermal transfer liquid may be a glycol/water composition or a phase change thermal transfer liquid. In one embodiment, the thermal energy storage system is charged or cooled by a vapor compression system.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

FIG. 1 is a schematic illustration of an embodiment of a flexible cooling system having a complex compound system, a thermal energy storage system, and a vapor compression system according to one embodiment.

DETAILED DESCRIPTION

Figure 1:
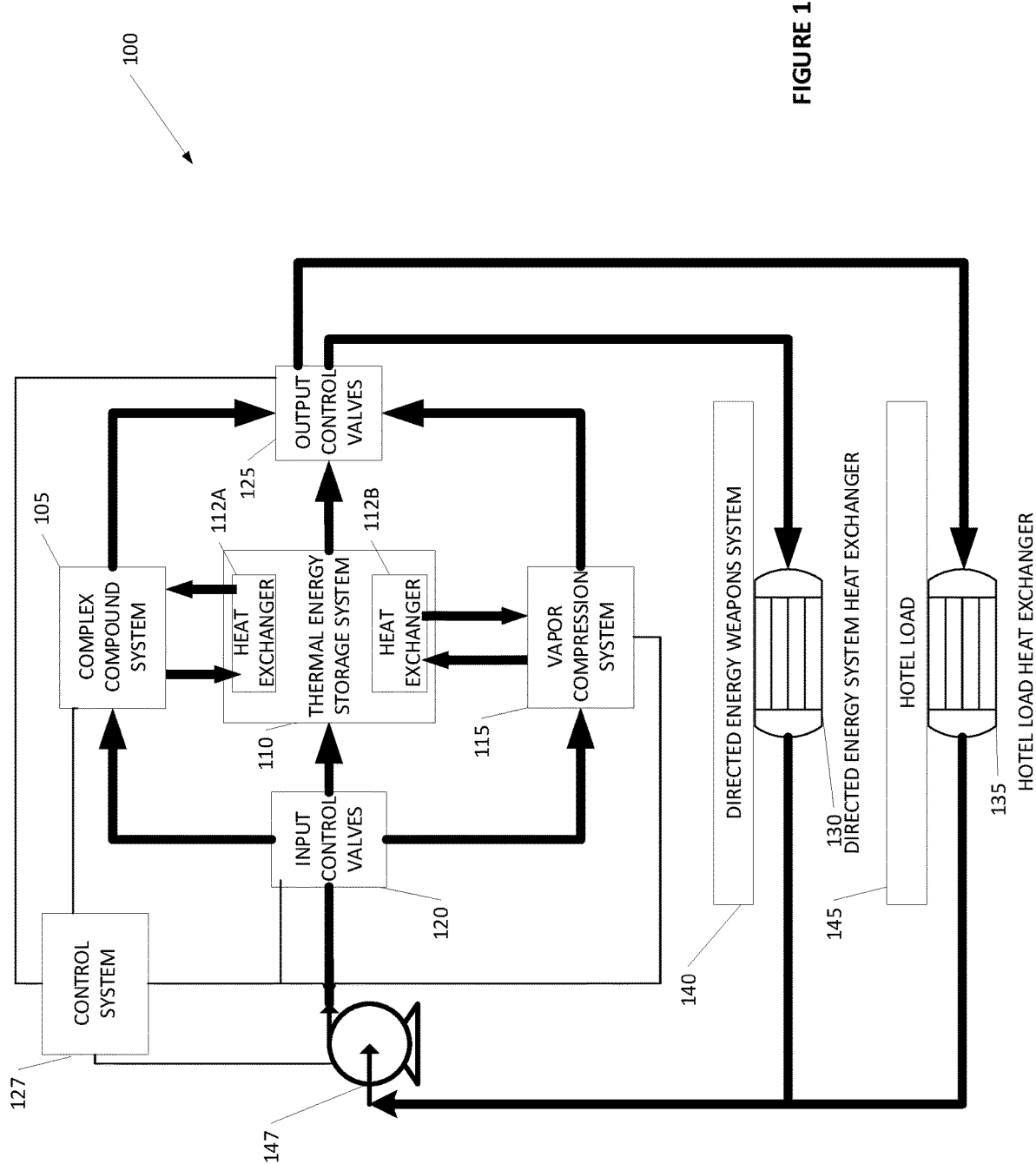

Systems and methods are disclosed for rapidly cooling products, devices or other heat loads. Such systems use a complex compound sorption system linked to a coil or other heat exchanger to rapidly cool the target product or device. Complex compound sorption reactions, i.e., adsorption and desorption of a gas on a solid substrate, may be carried out under conditions and in an apparatus intended to yield high power densities and very rapid burst mode cooling. In one embodiment the adsorption period and the desorption period are at different rates to maximize the power density and rapid cooling characteristics of the sorption system.

In one example, the flexible cooling system includes the complex compound burst mode cooling system that may be used for rapidly absorbing heat from loads that generate large bursts of thermal energy. One example of such a system that generates bursts of heat is a directed energy weapon system. These directed energy weapons systems, such as high energy laser systems, rapidly heat when activated. These devices may be fired repeatedly over a certain period of time, with each burst of energy lasting for only a few seconds. In some embodiments, these systems need to be maintained at a target temperature. For a high energy laser weapons system the target temperature may be approximately 10°, 15°, 20°, 25°, 30°, 35° or 40° C. or more.

To rapidly cool such a directed energy weapon system, embodiments of the invention include a complex compound sorption system configured with a burst mode operation that can absorb each blast of heat. Thermally connected to the directed energy weapons system and the complex compound system is a thermal energy storage system that can act as a sink to store heat being generated by the directed energy weapons system. As the complex compound system is burst mode cooling the heat from each firing event, the system may also transfer some of the heat absorbed from each firing event to the thermal energy storage system. In one embodiment this can be accomplished by using a heat exchanger to transfer heat absorbed by the complex compound system to a thermal heat transfer fluid such as glycol/water or refrigerant that is then routed to the thermal storage system. Alternatively, heated refrigerant or thermal heat transfer fluid coming from directed energy weapons system may be routed directly through the thermal energy system to release some of its thermal load.

In one embodiment, the complex compound system may be used to absorb the initial burst of heat and the thermal storage system may be used thereafter to continue removing heat by circulating a thermal heat transfer fluid through a cooling loop into a heat exchanger connected to the directed energy weapons system. In another embodiment, the vapor compression system is used to supplement the cooling capacity of the system as the directed energy weapons system is being discharged. Accordingly, during a firing event, the complex compound system, thermal energy storage system, and vapor compression system may all act in concert to provide cooling capacity to remove heat from the directed energy weapons system.

In one embodiment, the system only comprises a vapor compression system and a thermal energy storage system, wherein the thermal energy storage system is operated by a vector controller to increase its efficiency.

Directed energy weapons systems may also include additional ancillary mechanical or electrical equipment or components that need to be cooled in order to operate the weapons system efficiently. Such additional equipment, also termed a "hotel load" may include radar systems, batteries, power modules, generators, pumps, motors, computers, electronics and other equipment that is ancillary to the main weapons system. In particularly warm environments, such as the desert, these additional components may work more efficiently by being cooled prior to use. In particularly cold environments, such as during winter or northern or high elevations, these additional components may need to be heated to a target operating temperature in order to work more efficiently. Thus, in one embodiment, the flexible cooling system includes a vapor compression system that acts as an ancillary cooling/heating system configured to cool or heat these additional components (as well as the laser diode amplifiers) to a predetermined temperature, or within a temperature range, so that they operate efficiently in many types of environments. In addition, the vapor compression system may be used to recharge and cool the thermal energy system prior to the time the directed energy weapons system is in use.

The vapor compression system may be composed of multiple compressors, some dedicated to freeze and maintain frozen phase change material in the thermal energy storage system, and some configured to cool the hotel load. However, given a control signal that there is an immediate need to charge the thermal energy storage system, all compressors may be activated to charge the thermal energy storage system if the hotel load is determined to be able to afford a temporary lack of cooling. This determination may be based on whether the individual components of the hotel load are detected to be at or below their individual component design temperature. The compressors, some or all, may also be used to cool the high energy laser.

In some embodiments, the vapor compression system comprises a vapor compression system with a variable speed compressor that is controlled to vary the output capacity of the vapor compression system. The vapor compression system may be controlled by a Vector Control System (VCS) that is configured to optimize the efficiency of the vapor compression system by varying the torque placed on the compressor.

Embodiments of the Vector Control System (VCS) described herein expand the one-dimensional speed control of the vapor compression system into a two dimensional speed and torque control system. Incorporating torque control into the vapor compression system allows for optimal use of the compressor motor to increase the overall system efficiency. The VCS may control motors within the vapor compression system, such as the compressor motor, as well as fan and blower motors. A VCS optimization process can take into account characteristics of the compressor motor's performance as a function of speed, compression ratio and absolute pressures. The VCS may also take into account other system motors in the system to improve the efficiency of condenser fan(s) and in some cases evaporator fans or blowers or fluid pump motors in cases where the evaporator cools a heat transfer fluid. Vector Drive control constitutes a two dimensional energy efficiency optimization incorporating refrigerant flow as well as high side (condenser) air flow and, in some instances low side (evaporator) air flow or pumped fluid flow, deriving the best system energy efficiency obtainable at any given load and temperature condition. As will be recognized, fluid pumps are generally controlled by a motor and the term "pump" as used herein may include the motor that drives the pump. The motor may be part of the pump as a hermetic system or connected to the pump via a gear, belt or pulley, as known to those skilled in the art.

In one example, a vapor compression operating condition that conventionally calls for a certain predetermined compressor speed at a set condition is improved by operating the compressor at a lower torque setting while using the same refrigerant flow. Although the system would be using less torque the resultant cooling capacity would remain the same because the refrigerant flow through the vapor compression circuit doesn't change. The lower compressor torque could be achieved by increasing the airflow of a condenser fan. This increased airflow would lower the condenser temperature and pressure which may decrease the torque required by the compressor to compress the refrigerant. Depending on the compressor motor and condenser fan characteristics, the additional energy required to increase the fan speed could be less than the energy saved by reducing the torque on the compressor. Thus, in this embodiment, the VCS would evaluate the energy required to increase the condenser fan speed and balance that against the energy saved by lowering the torque on the compressor. If the energy saved by reducing the torque on the compressor was greater than the energy required to increase the fan speed, then the VCS would increase the condenser fan to save energy overall.

In other embodiments, reducing the compressor torque may reduce the overall efficiency if the energy required to increase the speed of the condenser fan is more than the energy required to operate the compressor at a higher torque. Thus, the VCS system can vary different components in different components within the vapor compression circuit to increase the overall system efficiency by modulating the torque placed on different motors and by adjusting the speed of the various motors to give the optimum energy efficiency.

The use of a vector control system may save the overall electrical energy requirements of a directed energy weapon system by reducing the power requirements for the cooling system. This may be important for directed energy weapons systems that are transportable and powered by portable generator systems using fossil fuels. In these transportable systems, the directed energy weapons system, portable generator, and cooling systems may be located on one or more mobile platforms. Since the energy required to operate the directed energy weapons system is being provided by a portable generator, any savings in electrical energy can translate into a fuel savings. By saving the fuel, the transportable system may be able to remain active for a longer period of time before needing to be refueled.

One embodiment of the invention is a cooling system that includes a thermal energy storage system that is controlled by a vector control system as described above for the vapor compression system. In this embodiment, the vector control system controls the speed and torque of a pump connected to the cooling loop of the thermal energy storage system. The pump may be configured to move a phase change fluid, such as refrigerant, through a cooling loop of the thermal energy storage system and to a heat exchanger connected to the thermal load in need of cooling and the evaporator of the vapor compression system for system charge and maintenance. The torque imposed on the the pump is proportional to the pressure drop of the phase change fluid flowing through the heat exchanger and thus a function of the flow rate and the vapor quality, i.e. the ratio of gas to liquid. Adjusting the speed of the pump motor will adjust the speed of the phase change fluid moving through the cooling loop. Because the phase change fluid is present in both liquid and gaseous states, the speed of the pump motor may also affect the quality (liquid/gas ratio) of the phase change fluid. Monitoring the torque placed on the pump motor may allow the vector control system to monitor and control the pressure drop of the phase change fluid as it passes through the pump via the vector control system adjusting the speed of the pump to and thus the quality of the phase change fluid to meet a desired target level. In one embodiment, the vector control system is activated while the thermal energy storage system is being charged by the vapor compression system. In another embodiment, the thermal energy storage system is activated during discharge of cooling from the thermal energy storage system. It should be realized that the vector control system may be used any time the thermal energy storage system pump motor is operated regardless of charge, discharge or maintenance cooling status of the thermal energy storage system.

The thermal energy storage system may work by freezing a thermal energy storage medium, such as water, into ice, or freezing a hydrated salt or paraffin within a tank. For example, the vapor compression system may cool a thermal transfer liquid, such as propylene glycol and water that is run through the thermal energy system in a series of heat transfer channels, tubes, plates or other heat exchanger. The heat exchangers run into a tank of thermal energy storage medium, also called phase change material or medium, and cool the storage medium to facilitate the phase change from liquid into solid. When the complex compound system needs to offload heat from a firing event, heat transfer fluid (refrigerant or a pumped thermal transfer liquid) can circulate into the heat exchanger inside the thermal energy storage system which is filled with phase change material, and which then cools the thermal heat transfer fluid and melts the phase change material.

It should be realized that thermal energy storage systems are not only made from frozen water ice but may be made from a variety of phase change materials. For example, clathrate, salt hydrate or paraffin compounds may be the phase change material. In some embodiments, the salt hydrate is potassium fluoride as the phase change material. In some embodiments, the salt hydrate is the 4 hydrate of potassium fluoride. In some embodiments, the paraffin is the 14 chain carbon paraffin having a melting temperature of between 5° C. and 25° C.

In some embodiments, the thermal energy storage system has its own pump connected to route thermal heat transfer fluid through the thermal energy storage system cooling loop. If the thermal heat transfer fluid is a liquid such as ethylene or propylene glycol water, the pump may be a pump that is controlled by a variable speed motor. If the thermal heat transfer fluid is phase change refrigerant, the pump motor may be connected to a vector control system (VCS) as the pressure drop (constituting torque) is now adjustable via the flow rate and the resulting degree of phase change of the refrigerant, also called the quality of the refrigerant. This is the ratio of liquid and gas components of the refrigerant. For example, at a relatively low flow rate with low pressure drop the quality of the refrigerant may go from 90% liquid to 50% liquid and at a high flow rate it may go from 80% liquid to 20% liquid. The vector control system may be programmed to optimize efficiency of the thermal energy storage system pump between the best amount of heat transfer and the resulting pressure drop of the refrigerant.

It should be realized that the system is robust and flexible in that all three cooling systems, the complex compound system, the thermal energy system, and the vapor compression system may be used serially or in parallel to increase the efficiency and operation of directed energy weapons system. In one embodiment, the complex compound system may absorb the initial heat bursts from firing the directed energy weapons system. In another embodiment, the heat bursts from firing the directed energy weapons system may be cooled by the thermal energy storage system alone by cycling refrigerant or thermal heat transfer fluid in a loop from a heat exchanger thermally connected to the directed energy weapons system directly to the thermal energy storage and back to the directed energy weapons system. While this thermal energy storage cooling loop may not be as efficient as using the complex compound system in conjunction with the thermal energy storage, there may be times when the complex compound system is being recharged, or inoperative, and so the thermal energy storage system, possibly in conjunction with the vapor compression system may provide enough cooling to allow the directed energy weapons system to keep firing, especially when all system are already operating.

The vapor compression system may normally act to cool or heat the hotel load from the ancillary equipment that is adjacent to the directed energy weapons system. However, in some circumstances the vapor compression system may be used to rapidly cool and freeze the phase change material within the thermal energy storage system, and during other times, especially during peak operations times the vapor compression system is also cooling the laser load. Thus, in advance of using the directed energy weapons system, the vapor compression system may be activated to freeze and maintain the phase change material in a frozen or partially frozen state within the thermal energy storage system.

In most circumstances, the complex compound system's first function is to provide the burst cooling during the initial start or raid transients. However, it should be realized that the complex compound system may also provide cooling capacity thereafter when the thermal energy storage system and vapor compression systems are operating to provide supplemental cooling at a now lower discharge rate. The decision whether the complex compound system should provide such supplemental cooling or recharge for the next thermal burst from the directed energy weapons system depends on the charge state of the complex compound system and the thermal load of the directed energy weapons system and support equipment as indicated by the vapor compression cooling loop temperature.

A control system monitors the temperatures of the various systems, including the directed energy weapons system, the ancillary components, the complex compound system, the thermal energy system and the vapor compression system. The control system uses stored logic and programming to determine the appropriate use of each component. If the system is idle, and the temperature of the thermal energy storage system is high, the control system may activate the vapor compression system to begin re-freezing the thermal energy storage system. However, if the control system also determines that the ancillary components are very hot, the control system may prioritize having the vapor compression system cool the ancillary components so they don't become damaged before having the vapor compression system re-freeze the phase change material in the thermal energy storage system. Alternatively, the control system may activate the vapor control system to cool the ancillary components and activate the complex compound system to begin cooling the phase change material in the thermal energy storage. The flexibility of the system allows for the control system to work towards being as efficient as possible to cool the components of the system and maintain the system in a state of readiness for the next activation of the directed energy weapons system.

In one embodiment, the vapor compression system is thermally linked to the hotel load of the directed energy weapons system. As used herein, the hotel load may include the ancillary and ancillary components necessary to run the directed energy weapons system in a variety of environments. For example, the hotel load may include climate control, communications, radar, batteries, lighting, engine and other components that give off heat and support use of the directed energy weapons system. The vapor compression system may be configured to maintain the hotel load at a predetermined temperature or temperatures as required by the components between and during burst cooling cycles as the system is being activated.

In some embodiments, the hotel load may need to be within a predetermined temperature range for the complex compound system to efficiently provide rapid cooling. The ancillary cooling system may be configured to maintain the thermal load or related environment at a predetermined temperature to help maximize the efficiency of rapidly cooling the directed energy weapons system with the burst mode cooling process.

It should be realized that the ancillary cooling/heating system may not be directly in thermal contact with the hotel load, but may instead be used to cool or heat the environment or equipment directly and/or indirectly relating to the hotel load. For example, the hotel load may be part of a larger system with pumps, motors, and other heat generating equipment. The vapor compression system may be configured to cool this related environment or related equipment. By heating or cooling the equipment adjacent the thermal load, this may help keep the thermal load at a predetermined temperature.

It should also be realized that there may be many different components of the hotel load that each need to be cooled (or heated) by the vapor compression system, either serially or in parallel. In one embodiment, the vapor compression system serially cools a set of hotel load components by running a thermal transfer liquid from relatively cool components to hotter components. For example, the vapor compression system may have a fluid line carrying thermal heat transfer fluid to a first heat exchanger adjacent a first component that is operating at 40° C. As the thermal heat transfer fluid leaves the first heat exchanger it may cool the first component to 35° C. and be warmed to near 30° C. The fluid line may then enter a second heat exchanger that is adjacent to or integrated in a second hotel load component that is operating at 55° C. If the thermal heat transfer fluid still has capacity to absorb additional heat, it can also cool the second component from 55° C. to 50° C. temperature.

In a second embodiment, the vapor compression system may connect in parallel to one of more of the components within the hotel load, such that each component has a heat exchanger directly tied to the vapor compression system.

In one embodiment, the hotel load may be a hotel load of a vehicle. In one embodiment, the hotel load is the thermal load caused by all systems on a vehicle other than propulsion. For example, a hotel load of a military transportation vehicle may be the thermal loads caused by radar equipment, inverters, electronics, batteries, cabin loads and the warfighter. Embodiments of the vapor compression system may be configured to thermally regulate these hotel loads to keep them at a predetermined temperature.

Because solid-gas sorption systems operate by adsorbing gas onto the solid complex compounds and then driving the absorbed gas off the complex compound through heating, they may be run on a myriad of energy types. For example, the complex compound system may be heated by fossil fuels, such as Diesel or JP-8, electricity, natural gas, solar thermal or any other type of heating system that has enough thermal power to drive the ammonia gas from the complex compound sorbent. In one embodiment, the complex compound sorption system is powered by waste heat from power generation equipment such as electrical generators.

In one embodiment, the complex compound system is powered by fossil fuels or natural gas, while the vapor compression system is powered by electricity. This combination may allow a portable trailer or truck housing a directed energy weapons system to be built within a relatively small footprint since the generator would not need to operate to drive the burst mode cooling supplied by the complex compound system.

In order to provide the relatively fast absorption rates contemplated by the complex compound cooling system, the system may use one specific complex compound and refrigerant, such as phase change ammonia. In one embodiment, the complex compound sorbent is $CaCl_2$, $MgCl_2$, $CoCl_2$, $FeCl_2$, $SrBr_2$, $SrCl_2$, $CaBr_2$ or $MnCl_2$ in combination with ammonia ($NH_3$) as the refrigerant. However, it should be realized that the complex compound may be selected from the following groups of salts:

(1) an alkaline earth metal chloride, bromide or chlorate salt, (2) a metal chloride, bromide or chlorate salt in which the metal is chromium, manganese, iron, cobalt, nickel, cadmium, tantalum or rhenium, (3) a double chloride salt selected from $NH_4AlCl_4$, $NaAlCl_4$, $KAlCl_4$, $(NH_4)_2ZnCl_4$, $(NH_4)_3ZnCl_5$, $K_2ZnCl_4$, $CsCuCl_3$, and $K_2FeCl_5$, (4) sodium bromide or ammonium chloride, and (5) transition metal halides, including zinc chloride.

Other complex compounds can be found in U.S. Pat. No. 4,848,994 issued on Jul. 18, 1989 and incorporated by reference herein for all purposes.

As described below, the complex compound system may be configured by the control system to provide a burst discharge for cooling the directed energy weapons system within a very short period of time. In one embodiment, each absorption period, which provides the burst cooling of the complex compound may be between 5 seconds and 300 seconds. In some embodiments, the absorption period may be between 10-200, 15-150, 20-100, 30-75 or 40-50 seconds. In other embodiments, the absorption period may be less than 200, 175, 150, 125, 100, 75, 50, 25, 10, 15, 7, or 5 seconds long.

In some embodiments, each absorption period may also be divided into multiple "pulse periods". For example, one absorption period of 25 seconds may be made up of three pulses of absorption for five seconds each, with a five second rest between each pulse. Other numbers of pulses within the absorption period, or number of rest periods are also contemplated. For example, the number of pulses within an absorption period may be 2, 3, 4, 5, 6, 7, 8, 9, 10, 11, 12, 13, 14, 15 or more pulses per absorption period. The pulse periods may be between 5-10, 5-20 or 5-30 seconds long each in some embodiments.

The control system may be configured in many ways to activate a burst mode cooling cycle of the complex compound system. In one embodiment, the controller is any electronic device or apparatus that activates, modulates, or deactivates the flow of refrigerant or heat transfer fluids in the system. The control system may include any electronic device or apparatus that controls heat at a burner within the system, particularly the complex compound system. The control system may include instructions for activating cooling in response to detection of an initial lasing period of a laser (e.g., a high energy laser). In examples, the initial lasing period is 45 seconds or less. In examples, a laser is activated in a beginning period and one or more transient periods, and the complex compound system is configured to be used during the beginning and the one or more transient periods. In examples, the complex compound system is configured to continue to operate during non-transient periods.

After the burst cooling is completed, the system needs to drive the absorbed ammonia gas from the complex compounds and so activates a heating pump that can circulate heated thermal media, such as an ethylene glycol and water mixture into the sorber. In one embodiment, the thermal media is approximately 30% or 50% ethylene glycol in water, however, other compositions of thermal media are also within the scope of embodiments of this invention. For example, the thermal media may be SYLTHERM™ (Dow Corning Corporation, Midland, Mich.), PARATHERM™ (Paratherm, King of Prussia, Pa.) or similar heat transfer fluids.

In one embodiment, the control system is linked to one or more temperature sensors and activates a burst mode cooling cycle when a temperature sensor near the directed energy weapons system reaches a predetermined target temperature. The temperature sensor may be thermally linked to the directed energy weapons system so when that thermal load reaches the predetermined target temperature, a burst mode cooling cycle is begun. Alternatively, the control system may be electronically linked to an activation signal that triggers a burst mode cooling cycle. The activation signal may be controlled by a predictive process that senses a variety of data and then predicts when to activate a cooling cycle. For example, the control system may sense the present temperature of the thermal load, the time since the last activation, and the state of other equipment of devices linked to the directed energy weapons system. Using this data, the system may activate a burst mode cooling cycle just before the directed energy weapons system starts to heat. In some embodiments, the control system may activate a cooling cycle 1, 2, 3, 4, 5, 6, or 10 seconds in advance of a determined cooling event.

Using the lean end of the coordination sphere yields faster rates of absorption with the option of having multiple pulse periods within each absorption cycle in even faster burst reaction rates. As used herein the coordination sphere is a central metal ion and its coordination ligands, in the subject coordination sphere, but not counting ligand molecules of a possible lower coordination sphere. In one embodiment the lean end of the coordination sphere is the lower 50% of the subject coordination sphere where less than 50% of the possible coordinating ligands, such as ammonia, are bound to the central metal ion. In other embodiments, the lean end of the subject coordination sphere may be the lower 30%, 25% or 20% of the coordination sphere. For example, the highest rates of ammonia absorption are when the complex compounds in the sorber have the most absorption sites available for bonding to ammonia molecules. $SrCl_2$ has eight available absorption sites for ammonia. The first coordination sphere is the 0-1 sphere, the second is the 1-8 sphere, the latter being of interest in the majority of embodiments of to the subject matter of this disclosure. The 0-1 and 1-8 spheres are the theoretical numbers not accounting for solid-solid solution effects that narrow the window of thermodynamic monovariancy. In the case of $SrCl_2$, the effective range of monovariancy in which the vapor pressure is independent of the ligand concentration is about 1.8-7.5. Thus, the time required for a mole of $SrCl_2$ to go from 1.8 mole of absorbed ammonia to 2.8 moles of ammonia in that second coordination sphere is much shorter than for one mole of $SrCl_2$ to go from 2.8 moles of absorbed ammonia to 3.8 moles of absorbed ammonia. However, in certain lower temperature ambient conditions, particularly less than 20° C., it may be preferable to start with less than 1.8 moles of ligand, and start the absorption within the 0-1 sphere, the first coordination sphere. For $SrCl_2$, the lean end of the coordination sphere may be the lower 20% of the coordination sphere. This is similar for the majority of other compounds. Embodiments of the flexible cooling system described herein are tuned to keep the complex compounds in the sorber at their leanest, with the fewest number of moles of ammonia, in order to allow higher reaction rates and resulting shorter reaction times for each absorption reaction, thus providing higher cooling power.

In one embodiment, the system is designed to absorb ammonia in the "leanest" portion of each complex compound's absorption profile. Thus, in embodiments of this system, if $SrCl_2$ is the compound, and each mole of $SrCl_2$ is capable of absorbing eight moles of ammonia, the system will be configured to have an absorption cycle that preferably absorbs ammonia when 3.5 or three or less moles of ammonia are absorbed to each mole of $SrCl_2$. If more than three moles of ammonia are absorbed onto each mole of $SrCl_2$ then the controller may instruct the system to perform a sorber heating cycle to drive off the bound ammonia and reset the complex sorbent to be back into its preferred range of fewer than three moles of ammonia per mole of $SrCl_2$ for another round of burst mode cooling.

Similarly, if $MnCl_2$ is the sorbent and can absorb up to six molecules of ammonia for each molecule of $MnCl_2$ with the relevant coordination sphere being the 2-6 mole sphere, then the system will be configured to have an absorption cycle to preferably absorb ammonia only when each mole of $MnCl_2$ has about 3.5, 3 or fewer moles of absorbed ammonia molecules, absorbing from about 2 moles of ammonia per mole of $MnCl_2$ to 3.5 moles of ammonia per mole of $MnCl_2$.

If $CaBr_2$ is the sorbent then the system may be configured to have an absorption cycle wherein ammonia is absorbed onto the $CaBr_2$ sorbent when less than about 3.5 moles of ammonia are already bound, absorbing from about 2 moles of ammonia per mole of $CaBr_2$ to 3.5 moles of ammonia per mole of $CaBr_2$. In some embodiments, the system may be configured to only absorb ammonia onto a $CaBr_2$ sorbent when there are less than about 3 moles of ammonia already bound to the $CaBr_2$ sorbent. These configurations can be managed by using the controller to tune the adsorption and desorption times to be active when the compound can be loaded with ammonia most efficiently.

In one embodiment, the temperature change/desorption period may be between 180 seconds and 15 minutes in order to reload the system. In some embodiments, the desorption period is less than 5, 4, or 3 minutes, or less.

A. System

FIG. 1 shows one exemplary flexible cooling system 100 that has a complex compound system 105 that is designed to provide burst mode cooling to rapidly cool a directed energy weapons system 140 during the first few seconds of operation by absorbing and desorbing ammonia into sorbers. One embodiment of a sorber can be found in U.S. Patent Publication 2016/0238286 A1 published on Aug. 18, 2016 and incorporated herein by reference for all purposes. Additional details on the complex compound system 105 can be found in FIG. 2.

The complex compound system 105 connects to output control valves 125 which control output of thermal heat transfer fluid from the complex compound system 105 to a heat exchanger 130 that is in thermal communication with a directed energy weapons system 140. The heat exchanger 130 then connects to a pump 147 which communicates with a set of input control valves 120 to form a complex compound cooling loop from the complex compound system 105 to the directed energy weapons system 140 and back again to the complex compound system 105.

As shown in FIG. 1, the pump 147 and input control valves 120 also connect to a thermal energy storage system 110. The thermal energy storage system 110 may include frozen or partially frozen phase change material that is used to cool the directed energy weapons system while active. The thermal energy storage system is connected to the output control valves 125 which connect the thermal energy storage system to the directed energy weapons system heat exchanger 130. The directed energy weapons system heat exchanger 130 connects to the pump 147 which can return heated thermal heat transfer fluid from the directed energy weapons system heat exchanger 130 to the input control valves 120 and back to the thermal energy storage system 110 in a thermal energy storage system cooling loop. It should be realized that in one embodiment the complex compound cooling loop and the thermal energy storage system cooling loop may use the same refrigerant or thermal heat transfer fluid and thereby share some of the same piping, valves and pumps to communicate within the system 100. Alternatively, the system 100 may include parallel cooling loops from the complex compound system and the thermal energy storage system where they do not share the same refrigerant, thermal heat transfer fluid, piping, valves and pumps, and therefore thermally communicate through the same or different heat exchangers with the directed energy weapons system.

Also connected to the input control valves 120 and output control valves 125 is a vapor compression system 115. Similar to the complex compound system 105 and thermal energy storage system 112A, the vapor compression system 115 may be used to form a cooling loop with the directed energy system heat exchanger 130. In one embodiment, the vapor compression system 115 is designed to form a vapor compression cooling loop to the hotel load heat exchanger in order to cool (or heat) the components of the system 100 that make up the hotel load. As shown, the output control valves 125 may route the thermal heat transfer fluid from the vapor compression system to the hotel load heat exchanger 135 that is adjacent to the hotel load 145. The pump 147 then may recirculate the thermal heat transfer fluid coming from the hotel load heat exchanger 135 back though the input control valves 120 to the vapor compression system 115, forming a loop.

As shown in FIG. 1, the vapor compression system 115 is also connected to the thermal energy storage system 110 through pipes running cold thermal heat transfer fluid through a heat exchanger 112B within the thermal energy storage system 110. In use, the vapor compression system may be used to recharge and cool the phase change material within the thermal energy storage system 110 so it can be ready to cool a future thermal load from the directed energy weapons system.

In one embodiment, as shown in FIG. 1, the complex compound system 105 is also thermally connected to a thermal energy storage system 110 through a heat exchanger 112A. The complex compound system 105 is connected to the heat exchanger 112A so that the complex compound system 105 may be used to cool the phase change material in the thermal energy storage system. In some embodiments, the heat exchangers 112A and 112B may be the same heat exchanger, but connected to both the complex compound system 105 and the vapor compression system 115.

As mentioned above, the complex compound system 105, thermal energy storage system 110 and vapor compression system 115 are connected to the set of input control valves 120 and output control valves 125. These valves control the flow of thermal heat transfer fluid or two phase refrigerant through the system 100 and into and out of each component. As shown, a control system 127 is in electrical communication with the complex compound system 105, vapor compression system 115, input control valves 120 and output control valves 125. By opening and closing the electrically controllable valves within the input control valves 120 and output control valves 125 the control system may control which component of the system is circulating thermal heat transfer fluid or refrigerant at any particular time during operation.

The output control valves 125 connect to a directed energy system heat exchanger that is in thermal communication with a directed energy weapons system 140. The directed energy weapons system 140 is shown as being thermally connected to the heat exchanger 130. In the case that two phase refrigerant is being circulated within the system 100, it should be realized that the heat exchanger may be an evaporator configured to change or partially change the phase of the refrigerant. In the case that a thermal heat transfer fluid or media is being circulated, the heat exchangers may be thermal transfer tubes, coils or plates configured to absorb heat into the thermal heat transfer fluid.

In one embodiment, the directed energy weapons system may be a high-energy laser, and the directed energy system heat exchanger 130 may be in thermal communication with the laser diodes and diode amplifiers of that system which generate the bulk of heat bursts while the system is activated. A high energy laser may include lasers that are 50, 75, 100, 125, 150, 250, or 500 kilowatt or higher energy lasers.

The output control valves 125 also connect to the one or more hotel loads heat exchangers 135 that are in thermal communication with the hotel load 145 adjacent to the directed energy weapons system 140. As discussed above, the hotel load 145 may include the batteries, motors, radar, communications and other equipment that is ancillary to the directed energy weapons system. As mentioned above, in the circumstance where thermal transfer media is used instead of refrigerant, the hotel load heat exchangers may be replaced with a thermal transfer system configured to transfer heat to the thermal transfer media.

The pump 147 is connected to the outputs of the directed energy weapons system heat exchanger 130 and hotel load heat exchanger 135 and used to move thermal heat transfer fluid or refrigerant into the input control valves 120 so the system may recirculate these fluids back into to the complex compound system 105, thermal energy storage system 110 or vapor compression system 115.

It should be realized that the system 100 may include more than the one pump 147 and that additional pumps, fans, valves and motors may be included within the system to operate as described herein. For example, additional pumps may be included adjacent to the output control valves 125 to move thermal heat transfer fluid to the coils 130, 135. Fans may be disposed adjacent to the directed energy system heat exchanger 130 or hotel load heat exchanger 135 to move heated air across the heat exchangers.

Figure 2:
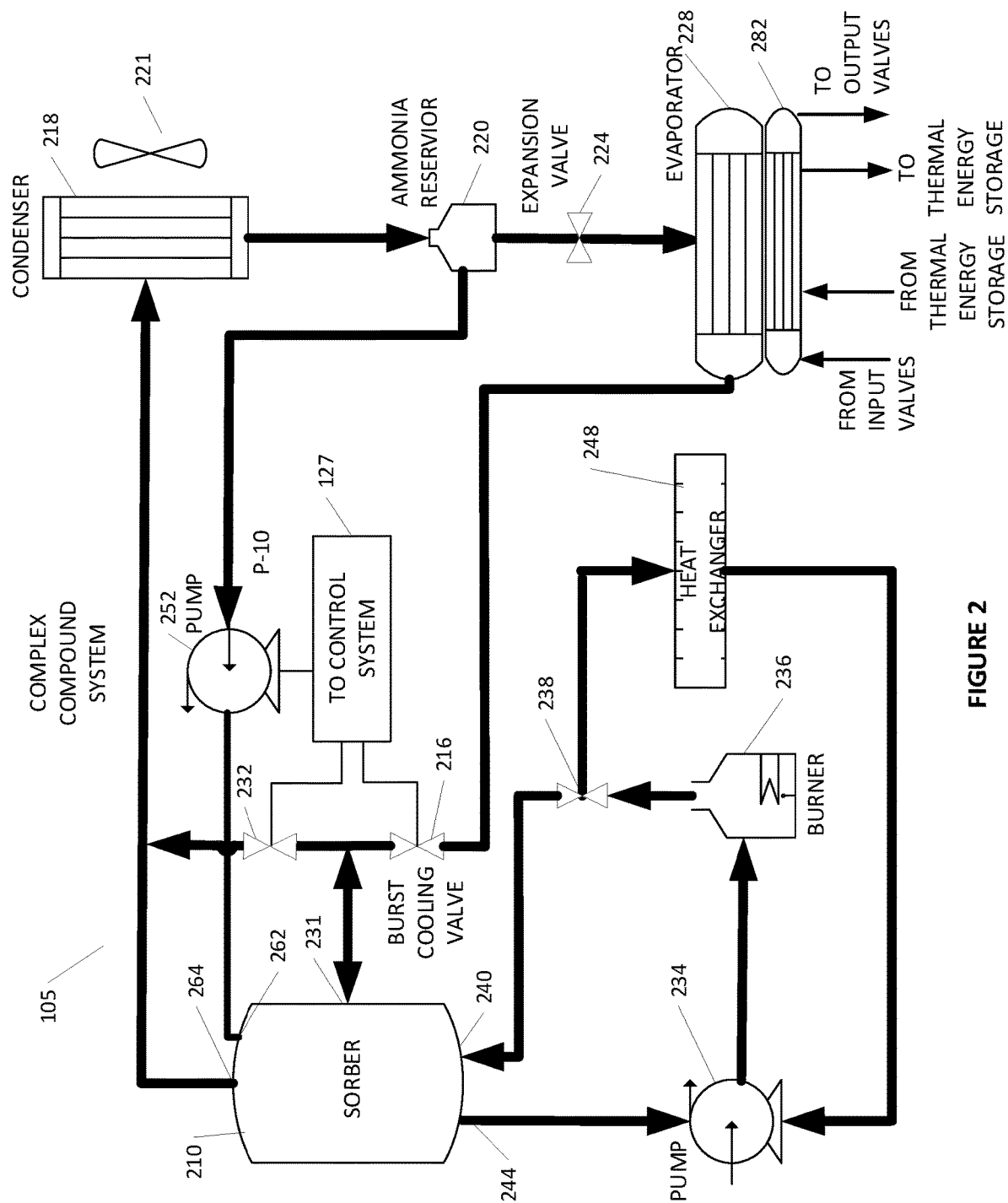
FIG. 2 is a schematic illustration of an embodiment of a complex compound system according to one embodiment.

FIG. 2 shows additional details of the complex compound system 105 shown in FIG. 1. As shown, the complex compound system includes a sorber 210 that is designed to absorb and desorb ammonia. When the complex compound system is activated, the cycle begins when a burst cooling valve 216 is opened under control of the control system 127. Opening the valve 216 allows condensed ammonia stored in an ammonia reservoir 220 to rapidly expand through an expansion valve 224 and move through an evaporator 228. As the expanding ammonia liquid changes to a gas and moves through the evaporator 228 it absorbs heat from an adjacent heat exchanger 282. This rapidly cools the heat exchanger 282 and any thermal transfer liquid flowing through the heat exchanger 282. The ammonia liquid that was evaporated to gas by the heat exchanger 282 moves through the open burst cooling valve and into an inlet/outlet 231 to the sorber 210 where it becomes absorbed onto the complex compounds within the sorber 210.

As shown, thermal heat transfer fluid from the input valves enters the heat exchanger 282 and would be rapidly cooled. The cooled thermal transfer liquid would then exit the heat exchanger 282 through the output valves. In addition, the thermal transfer liquid coming from the thermal energy storage system may also enter and exit the heat exchanger 282 to be rapidly cooled in the case where the complex compound system is being used to cool the phase change material to recharge the thermal energy storage system.

After the burst cooling is completed, the system needs to drive the absorbed ammonia gas from the complex compounds and so activates a heating pump 234 that can circulate heated thermal media, such as an ethylene glycol and water mixture into the sorber. In one embodiment, the thermal media is approximately 30% ethylene glycol in water, however, other compositions of thermal media are also within the scope of embodiments of this invention. For example, the thermal media may be SYLTHERM™ (Dow Corning Corporation, Midland, Mich.), PARATHERM™ (Paratherm, King of Prussia, Pa.) or similar heat transfer fluids.

Activating the heating pump 234 moves the thermal media into a burner 236 that heats the media to a target temperature. In one embodiment the target temperature is between 120° C. and 150° C. In another embodiment the target temperature is 130° C. The heated thermal media is then pumped through a control valve 238 and into a hot thermal media inlet 240 within the sorber 210. The thermal media flows out of the sorber 210 from a hot thermal media outlet 244 and back to the heating pump 234. The heated thermal media circulates through the sorber 210 for a predetermined period of time to drive off the absorbed ammonia gas so that the sorber can enter another cycle of absorbing ammonia onto its complex compound surface.

To run the heated thermal media efficiently through the sorber 210, the system also includes a heat exchanger 248 that can have heated thermal media flowing through it during times when the sorber 210 does not need to be heated. The control valve 238 is controlled by the controller to switch the flow of thermal media to the heat exchanger 248 when the sorber does not need to be heated, and to the sorber 210 when it's time to heat the sorber within the refrigeration cycle. Hence the heated fluid can also be used to provide heating to the laser or other components that are too cold for operation our below their minimum spec temperature for operation.

The heated ammonia gas moves out the inlet/outlet 231, through an ammonia gas return valve 232, and flows towards a heat exchanger 218 to start an additional cycle. The control system controls the burst cooling valve 216 and the ammonia gas return valve 232 to that ammonia gas enters and exits the sorber properly during each cycle. At the heat exchanger 218, the ammonia gas may be cooled and condensed with a condenser towards a liquid state before flowing into an ammonia reservoir 224. The ammonia reservoir acts as a holding container for pressurized ammonia gas or liquid prior to being recirculated to the sorber, or used for burst mode cooling.

After the sorber is heated to drive off absorbed ammonia, the sorber needs to cool to be able to absorb ammonia for the next round in the refrigeration cycle. To help cool the sorber, the system includes a cooling pump 252 that circulates ammonia from the ammonia reservoir 220 into a series of cooling thermal media lines within the sorber 210. The cooling pump 252 is activated by the control system and draws ammonia from the reservoir 220 and flows it into a thermal media inlet 262 of the sorber 210 and out a thermal media outlet 264. The ammonia absorbs heat from inside of the sorber 210 and then recirculates that heated ammonia to the heat exchanger 218 to help cool down the sorber for the next round of absorption.

Figure 3:
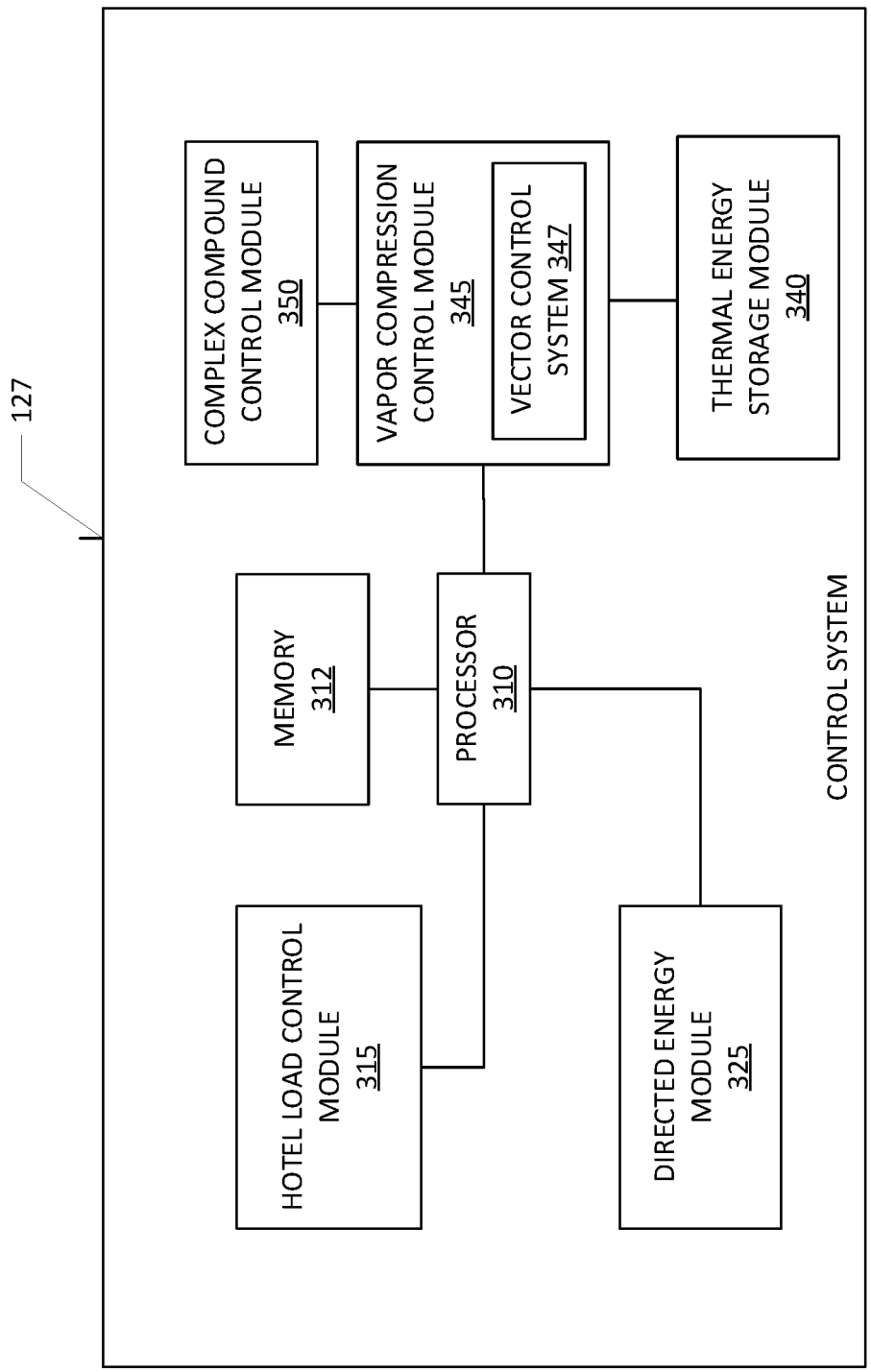
FIG. 3 is a block diagram of an embodiment of a control system that is part of the flexible cooling system of FIG. 1.

FIG. 3 shows an illustration of the control system 127, which is programmed with instructions to control operations of the system 100. The control system 127 includes a processor 310 which may be any type of well-known microprocessor or microcontroller that is capable of managing the valves, fans and other components of the system 100. The processor 310 is connected to a memory 312 for storing programs and commands for operating the system.

The processor 310 is connected to a directed energy module 325 which includes instructions for activating a cooling cycle in response to the directed energy weapons system being activated by firing. In one embodiment, the directed energy module 325 is programmed to activate the burst mode cooling cycle from the complex compound system and begin to rapidly cool the thermal load when a predetermined signal is received by control system 127. The signal may be an activation signal from a firing system connected to the directed energy weapons system. With each firing event the weapon system may interface with a complex compound control module 350 to trigger the burst cooling mode of the system 100 in order to reduce the temperature of the weapon system.

In one embodiment, the directed energy module 325 communicates with a temperature sensor which monitors the temperature of the directed energy thermal load. In one embodiment, the directed energy module 325 activates a burst cooling cycle by interfacing with the complex compound control module 350 when the temperature of the directed energy load reaches a predetermined temperature. For example, when the temperature of the directed energy system is above 10° C. and below 50° C., then the directed energy module 325 instructs the complex compound control module 350 to activate the burst cooling valve to cool the thermal load below its target temperature. In other embodiments, the burst cooling valve may be activated by the complex compound control module 350 when the temperature of the directed energy load is above 15° C. and below 45° C. or above 20° C. and below 40° C. Of course, embodiments are not limited to performing only a single burst cooling procedure. During activation, the thermal load, or an attached weapons system, may request multiple burst mode cooling operations to maintain the temperature of the thermal load below a certain target temperature.

The controller 118 also includes a vapor compression control module 345 that includes instructions for managing the motor, valve and pump functions of the vapor compression system discussed above. For example, the vapor compression control module may control the input valves and output valves, along with valves routing thermal heat transfer fluid into and out from the thermal energy storage system. By manipulating these valves, the vapor compression control module may route thermal heat transfer fluid to the particular components of the system 100 as needed to efficiently operate the system.

As shown the vapor compression control module may also include a vector control system 347 that is configured as discussed above to provide efficient control of the vapor compression system compressor and torque. For example, the vector control system 347 may monitor the torque placed on a compressor within the vapor compression system and adjust the speed of one or more fans or blowers to alter the pressure within the system to increase, or decrease, the torque placed on the compressor to increase the vapor compression system efficiency.

As shown, the control system 127 also includes a hotel load control module 315 for controlling cooling of the hotel loads within the system 100. The hotel load control module 315 may include instructions for reading data from temperature or other environmental sensors and determining the proper parameters for cooling or heating the hotel load or adjacent systems of the directed energy weapons system. For example, if the hotel load control module 315 receives data showing that the hotel load is above 40° C. it may activate the vapor compression system to begin a cooling cycle to reduce the temperature of the hotel load back down to a target temperature. Similarly, if the hotel load control module 315 determines that the thermal load is below, for example, 5° C. it may initiate a heating cycle of the vapor compression system to increase the temperature of the thermal load up to a target temperature.

In one embodiment, the hotel load control module 315 maintains the temperature of the hotel load or ancillary equipment within the range of 25° C. to 50° C. In another embodiment, the hotel load control module 315 maintains the temperature of the hotel load or ancillary equipment within the range of 20° C. to 30° C. However, embodiments are not limited to only these temperature ranges. The hotel load control module 315 may be designed to maintain the temperature of the thermal load or ancillary equipment to be above its minimum equipment design operating temperature in cold climates for an efficient start-up. Similarly, the hotel load control module 315 may be designed to cool the hotel load or ancillary equipment to be below the equipment's maximum design operating temperature at any ambient temperature if the equipment generates heat. This allows the equipment to be placed in relatively hot ambient environments, such as the desert, where the ambient conditions alone may require cooling of the equipment to be within the range of, for example, 5° C. to 40° C.

Other embodiments include a hotel load control module 315 that maintains the temperature of the hotel load or ancillary equipment in order for efficient cooling of the thermal load to occur. Of course, the system is not limited to only managing thermal loads at these temperature parameters. The hotel load control module 315 may detect when temperatures of a thermal load is above 5° C., 10° C., 15° C., 20° C., 25° C., 30° C., 35° C., 40° C. or more before activating the vapor compression system. In some embodiments the hotel load control module 315 is also configured to maintain operating temperatures of equipment that is a subsystem, of linked system to the thermal load. For example, the thermal load may be adjacent to, or electronically linked with, electronic subsystems, such as radar, electronic or power inverters, generators, high-capacity batteries, cabin/enclosures and warfighter cooling systems. The hotel load control module 315 may be designed to maintain the operating temperatures of each of these ancillary devices or systems in addition to maintaining the operating temperature of the thermal load and adjacent equipment.

The hotel load control module 315 may also gather data from other sources, such as through a network connection to determine the predicted environmental temperature for the day. For example, the hotel load control module 315 may receive the predicted daytime high temperature from a weather service across a network and use that data to ensure that the thermal load or other ancillary components of the target system remain cool to a predetermined target temperature.

The control system 127 also includes a thermal energy storage module 340 that is configured to manage the use and temperature of the thermal energy storage system. For example, the thermal energy storage module 340 may communicate with a temperature sensor within the thermal energy storage system and activate the vapor compression system when the temperature of the thermal energy storage system is above a target temperature. The vapor compression system may then start cooling the thermal energy storage system back to its target temperature. The thermal energy storage module 340 may also be activated by the directed energy module 325 to begin a cooling cycle in response to the directed energy weapons system being discharged. For example, following a discharge the directed energy module may instruct the thermal energy storage module 340 to begin a cooling cycle. The thermal energy storage module 340 would then adjust the input control valves and output control valves so that thermal heat transfer fluid running through the thermal energy storage system begins circulating in a thermal energy cooling loop though the heat exchanger adjacent to the directed energy weapons system.

It should be realized that aspects of the control system may manage the variable speed operation of various pumps and fans within the system based on the temperature of the thermal load. For example, as the temperature of the thermal load, or surrounding environment, increases the speed of pumps and fans within the system may also increase. Similarly, as the temperature of the thermal load, or surrounding environment decreases, the controller may slow the speed of the pumps and/or fans.

B. Operation

In operation, a cycle may be activated when a directed energy weapons system is first begun to be powered up for use. While the below operation is described for circulating refrigerant to the hotel load and directed energy system coil, it should be realized that the system is not limited to using refrigerant, and thermal heat transfer fluids may also work similarly within the system.

As can be realized, these systems include ancillary equipment that may need to be cooled before the system becomes fully operational. For example, the ancillary equipment may be powered on along with the vapor compression system. The control system may therefore activate the output control valves such that the refrigerant output of the vapor compression system is routed to the various components of the hotel load heat exchanger, the input control valves are set to recirculate the refrigerant from the hotel load heat exchanger back to the vapor compression system, and the pump is activated to move the refrigerant in a cooling loop to begin removing heat from the hotel load.

The control system may detect the temperature of the thermal energy storage system using a temperature sensor, and determine if the thermal energy storage system is cooled to a target temperatures so that it may act as a heat capacitor to absorb excess heat from the system once the system becomes operational. If the control system determines that the temperature of the thermal energy storage system is above a predetermined threshold it may begin routing thermal heat transfer fluid that has been cooled by the vapor compression system into the thermal energy storage system. The control system may include programming to balance the cooling requirements of the hotel load against the necessity to also cool the thermal energy storage system, and determine the priority for each system based on their current temperature and how soon the system may need to use the thermal energy storage system.

Once the system is ready to fire, the complex compound system may be put into a standby mode where it is ready to begin burst mode cooling as soon as a firing event is detected or a control signal indicates immediate firing to be initiated. Once a firing event is signaled or detected the complex compound system will enter a burst mode cooling cycle. The control system will open the input control valve so that heated thermal heat transfer fluid from the directed energy system heat exchanger is routed into the complex compound system to rapidly remove the heat. The complex compound system may be in an absorption cycle, with a plurality of refrigeration pulses to rapidly cool the heated thermal heat transfer fluid from the directed energy system heat exchanger. Within this cycle, the complex compound system may route some of the heated thermal fluid through the heat exchanger in the thermal energy storage system to reduce the temperature of the thermal fluid to reduce the cooling demand on the complex compound system.

As the directed energy system heat exchanger continues to detect firing events and transfer heat from the heat exchanger to the complex compound system for burst cooling, the control system may monitor each component to ensure that the flexible system is operating efficiently. For example, in one embodiment in the first 5, 10, 15, 20, 25, 30 or more seconds following activation the heated thermal heat transfer fluid from the directed energy system heat exchanger may not be routed to the thermal energy storage system because the cooling requirement during that firing event may be handled by the complex compound system alone. However, as the firing events continue and the thermal load of the directed energy weapons system maintains or increases, the control system may route a portion of the refrigerant coming from the directed energy weapons system heat exchanger to the thermal storage system and/or the vapor compression system.

For example, following activation the system may use the complex compound system to rapidly absorb heat into the complex compound sorbers by initiating a complex compound cooling cycle. The system may also activate a pump to move cold thermal heat transfer fluid from the thermal energy storage system to the directed energy weapons system heat exchanger to supplement the cooling provided by the complex compound system. Because the thermal energy storage system does not absorb heat as quickly as the complex compound sorber, this cooling loop may not provide substantial cooling for the first about 30 seconds following activation. However, the capacity of the thermal energy storage system to continue providing cooling to the directed energy weapons system heat exchanger is relatively high and can substantially supplement the burst cooling provided by the complex compound system.

It should be realized that the vapor compression cooling system may also be used to supplement the cooling provided by the complex compound system. Similar to how the thermal energy storage system is used following activation of the directed energy weapons system, the vapor compression system may also act to supplement cooling of the directed energy weapons system heat exchanger. Thus, following activation, the complex compound system may provide rapid burst mode cooling for the first seconds after the weapon's activation. Then the vapor compression system may be activated to provide a cooling loop to the directed energy weapons system heat exchanger and provide additional cooling capacity above that provided by the complex compound system and/or the thermal energy storage system.

Figure 4:
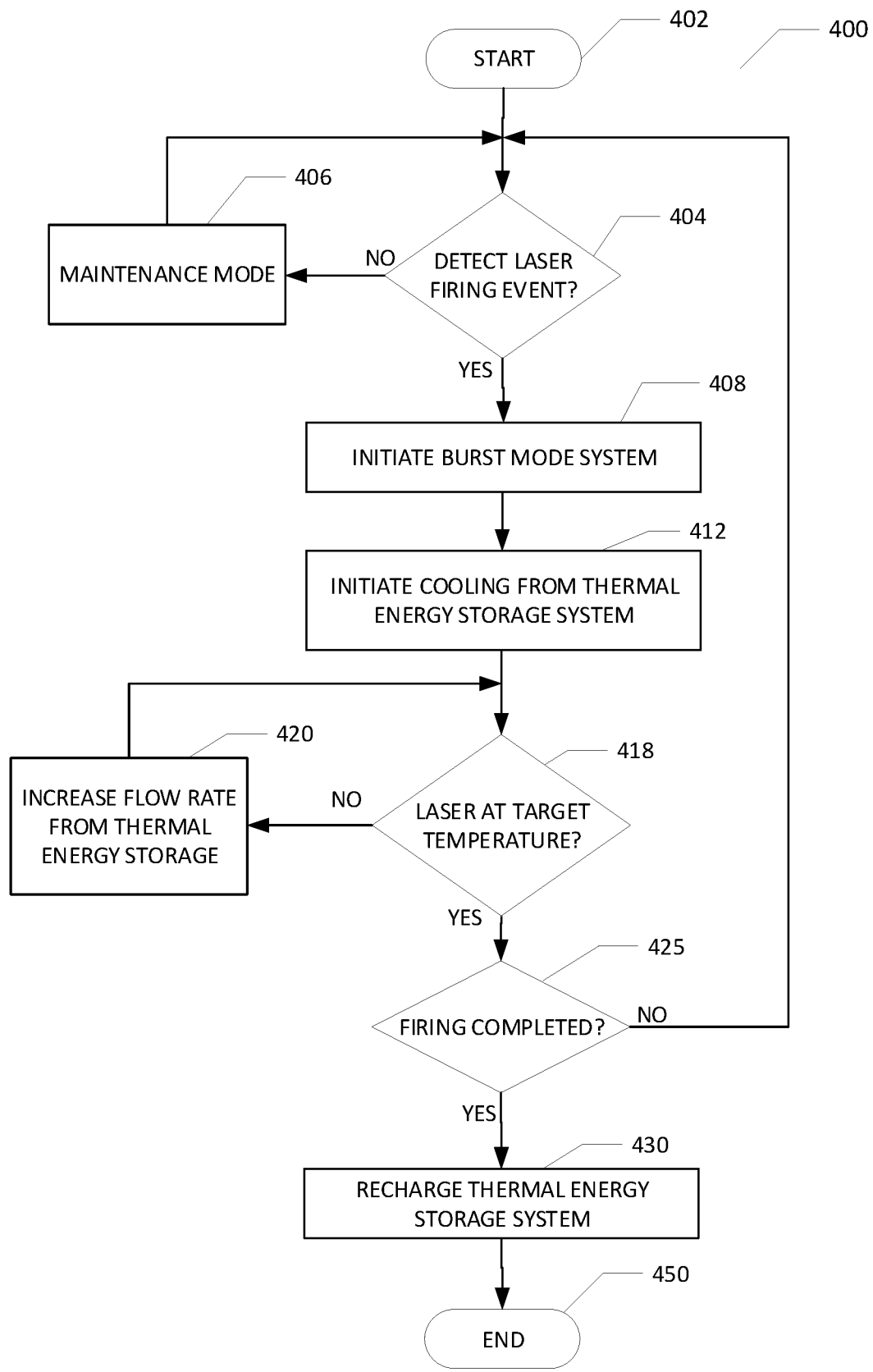
FIG. 4 is a flow diagram of one embodiment of operating a flexible cooling system.

FIG. 4 describes one process 400 for cooling a laser weapon. The process 400 begins at a start state 402 and then moves to a decision state 404 wherein a determination is made whether a laser firing event has been detected by the control system. If a laser firing event is not detected the process 400 moves to state 406 and enters a maintenance mode. In the maintenance mode the system continues to maintain the hotel load at a target operational temperature so that the system is ready to operate once a firing event has been detected. During the maintenance mode the vapor compression system may be used to recharge the phase chance material or media housed within the thermal energy storage system so that the thermal energy storage system is prepared to deliver cooling power to the system when needed.

If a determination made at the decision state 404 that a laser firing event has been detected, then the process 400 moves to a state 408 wherein the complex compound system is initiated to quickly absorb a burst of heat, for example 25, 50, 75, 100, 125, or 150 kilowatts of heat energy from the laser system. The complex compound system may quickly absorb that initial burst of heat quickly. After activating of the burst mode cooling system at the state 408, the process 400 moves to a state 412 wherein a cooling loop from the thermal energy storage system is activated to provide additional cooling power to the laser weapon. Because the thermal energy storage system may take 15, 20, 30, 45, 60 or more seconds to being absorbing heat, it may be used as an ancillary cooling supply to the more rapid cooling provided in the first few seconds after a firing event by the burst mode cooling of the complex compound system.

After the cooling loop from the thermal energy storage system is been initiated, the process 400 moves to a decision state 418 wherein a determination is made whether the laser weapons system is at its target temperature. Typically, this target temperature may be between 15° C. and 30° C. If the laser weapons system is not at the target temperature then the process 400 moves to a state 420 wherein the flow rate of the cooling loop from the thermal energy storage system may be increased to help move additional heat away from the laser weapons system. Additionally, a vapor compression system may also be brought online to add additional cooling power to the overall system and help reduce the temperature of the laser weapons system.

If a determination is made at the decision state 425 that the laser is at the target temperature, then the process 400 moves to a state 425 wherein a determination is made whether the laser firing process has been completed. If the process has not been completed, then the process 400 returns to the decision state 404 in order to wait for additional firing events. If a determination is made at the decisions state 425 that the laser firing has been completed then the process 400 moves to a state 430 wherein the vapor compression system may begin recharging the phase change material within the thermal energy storage system so it can be ready to provide additional cooling for future firing events. The process 400 then moves to an end state 450 and terminates.

Headings are included herein for reference and to aid in locating various sections. These headings are not intended to limit the scope of the concepts described with respect thereto. Such concepts may have applicability throughout the entire specification.

The previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

While the above description has pointed out novel features of the invention as applied to various embodiments, the skilled person will understand that various omissions, substitutions, and changes in the form and details of the device or process illustrated may be made without departing from the scope of the invention.

What is claimed is:

1. A thermal management system, comprising:
   one or more input valves;
   a heat exchanger configured to transfer heat from a laser system using a heat transfer fluid, wherein the heat exchanger is configured to cool a laser of the laser system;
   one or more pumps configured to receive the heat transfer fluid from the heat exchanger and provide the heat transfer fluid to the one or more input valves;
   a complex compound system configured to cool a first portion of the heat transfer fluid using a burst discharge of a fluid during an absorption period, wherein the absorption period is a period of time, and wherein the one or more input valves are configured to deliver the first portion of the heat transfer fluid to the complex compound system;
   a thermal energy storage system comprising a phase change material, wherein the thermal energy storage system is configured to cool a second portion of the heat transfer fluid during the absorption period using the phase change material, and wherein the one or more input valves are configured to deliver the second portion of the heat transfer fluid to the thermal energy storage system;

one or more output valves configured to receive the first portion of the heat transfer fluid from the complex compound system and receive the second portion of the heat transfer fluid from the thermal energy storage system; and a control system configured to:
  detect a laser firing event of the laser;
  initiate, in response to the laser firing event, cooling the first portion of the heat transfer fluid using the complex compound system;
  monitor a temperature of the laser system during the absorption period, and
  increase, based on the temperature, a flow rate of the second portion of the heat transfer fluid delivered by the one or more input valves to the thermal energy storage system.

2. The thermal management system of claim 1, wherein the complex compound system comprises:
  a reservoir and a valve, wherein the valve is configured to release the fluid from the reservoir during the burst discharge of the fluid; and
  a sorber configured to:
    adsorb the fluid on a substrate; and
    drive the fluid, using heat, from the substrate.

3. The thermal management system of claim 2, wherein the sorber is configured to receive heat from a generator system configured to combust a fuel to drive the fluid from the substrate.

4. The thermal management system of claim 2, wherein the sorber is configured to receive waste heat from power generation equipment to drive the fluid from the substrate.

5. The thermal management system of claim 1, wherein the phase change material comprises a salt hydrate.

6. The thermal management system of claim 5, wherein the salt hydrate comprises a potassium fluoride salt hydrate as the phase change material.

7. The thermal management system of claim 1, wherein the phase change material comprises a paraffin.

8. The thermal management system of claim 7, wherein the paraffin comprises a paraffin with a melting temperature between 5° C. and 25° C.

9. The thermal management system of claim 1, further comprising a vapor compression system configured to cool at least one of the complex compound system or the thermal energy storage system.

10. The thermal management system of claim 9, wherein the vapor compression system comprises a variable speed compressor configured to vary an output capacity of the vapor compression system.

11. The thermal management system of claim 9, wherein the vapor compression system comprises a compressor and a vector control system, and wherein the vector control system is configured to vary a speed and torque of the compressor to increase the energy efficiency of the vapor compression system.

12. The thermal management system of claim 9, wherein the vapor compression system is configured to cool ancillary equipment connected to the laser system.

13. The thermal management system of claim 12, wherein the vapor compression system is configured to provide supplemental cooling to the laser system.

14. The thermal management system of claim 1, wherein the control system comprises instructions for initiating a burst cooling cycle of the complex compound system in response to detection of the laser firing event during an initial lasing period of the laser.

15. The thermal management system of claim 14, wherein the initial lasing period is 45 seconds or less.

16. The thermal management system of claim 1, wherein the phase change material comprises ice or clathrate.

17. The thermal management system of claim 1, wherein the complex compound system is configured to cool the thermal energy storage system.

18. The thermal management system of claim 1, wherein the vapor compressions system and the complex compound system are configured to charge the thermal energy storage system.

19. A thermal management system, comprising:
  one or more input valves;
  a heat exchanger configured to transfer heat from a laser system using a heat transfer fluid, wherein the heat exchanger is configured to cool a laser of the laser system;
  one or more pumps configured to receive the heat transfer fluid from the heat exchanger and provide the heat transfer fluid to the one or more input valves;
  a complex compound system configured to cool a first portion of the heat transfer fluid using a burst discharge of a fluid during an absorption period, wherein the absorption period is a period of time, and wherein the one or more input valves are configured to deliver the first portion of the heat transfer fluid to the complex compound system;
  a thermal energy storage system comprising a phase change material, wherein the thermal energy storage system is configured to cool a second portion of the heat transfer fluid during the absorption period using the phase change material, and wherein the one or more input valves are configured to deliver the second portion of the heat transfer fluid to the thermal energy storage system
  one or more output valves configured to receive the first portion of the heat transfer fluid from the complex compound system and receive the second portion of the heat transfer fluid from the thermal energy storage system;
  a control system configured to:
    detect a laser firing event of the laser;
    initiate, in response to the laser firing event, cooling the first portion of the heat transfer fluid using the complex compound system;
    monitor a temperature of the laser system during the absorption period, and
    increase, based on the temperature, a low rate of the second portion of the heat transfer fluid to the thermal energy storage system; and
  a vector control system communicating with the one or more pumps to increase the energy efficiency of the thermal management system.

20. The thermal management system of claim 19, further comprising one or more vapor compression systems configured to cool the thermal energy storage system.

21. A method of cooling a heat load, comprising:
  transferring heat, using a heat exchanger, from a laser system using a heat transfer fluid, wherein the heat exchanger is configured to cool a laser of the laser system;
  receiving, using one or more pumps, the heat transfer fluid from the heat exchanger and providing, using the one or more pumps, the heat transfer fluid to one or more input valves;
  delivering, using the one or more input valves, a first portion of the heat transfer fluid to a complex compound system and a second portion of the heat transfer fluid to a thermal energy storage system, wherein the complex compound system comprises a phase change material;

detecting, using a control system, a laser firing event of the laser;

initiating, using the control system, and in response to the laser firing event, cooling, using the complex compound system, the first portion of the heat transfer fluid using a burst discharge of a fluid during an absorption period, wherein the absorption period is a period of time;

cooling, using the thermal energy storage system, the second portion of the heat transfer fluid during the absorption period using the phase change material;

receiving, using one or more output valves, the first portion of the heat transfer fluid from the complex compound system and the second portion of the heat transfer fluid from the thermal energy storage system;

monitoring, using a control system, a temperature of the laser system during the absorption period; and increasing, using the control system, a flow rate of the second portion of the heat transfer fluid delivered by the one or more input valves to the thermal energy storage system based on the temperature.

22. The method of claim 21, further comprising cooling the thermal energy storage system using a vapor compression system to cool and freeze a phase change material in the thermal energy storage system.

* * * * *